United States Patent
Mogi et al.

(10) Patent No.: US 8,110,306 B2
(45) Date of Patent: Feb. 7, 2012

(54) BINDER COMPOSITION FOR SECONDARY BATTERY ELECTRODE, SLURRY FOR SECONDARY BATTERY ELECTRODE, AND SECONDARY BATTERY ELECTRODE

(75) Inventors: Takeshi Mogi, Chuo-ku (JP); Kazuaki Itou, Chuo-ku (JP); Hirobumi Suzuki, Chuo-ku (JP); Akira Nishikawa, Chuo-ku (JP)

(73) Assignee: JSR Corporation, Tokyo (JP)

( * ) Notice: Subject to any disclaimer, the term of this patent is extended or adjusted under 35 U.S.C. 154(b) by 738 days.

(21) Appl. No.: 12/158,614

(22) PCT Filed: Dec. 22, 2006

(86) PCT No.: PCT/JP2006/325653
§ 371 (c)(1),
(2), (4) Date: Nov. 28, 2008

(87) PCT Pub. No.: WO2007/072948
PCT Pub. Date: Jun. 28, 2007

(65) Prior Publication Data
US 2009/0280409 A1    Nov. 12, 2009

(30) Foreign Application Priority Data

Dec. 22, 2005 (JP) ................................ 2005-370993

(51) Int. Cl.
*H01M 4/62* (2006.01)
*C08F 228/02* (2006.01)
(52) U.S. Cl. ...................... 429/217; 252/182.1; 526/286
(58) Field of Classification Search .................. 429/217; 252/182.1; 526/286
See application file for complete search history.

(56) References Cited

U.S. PATENT DOCUMENTS

| | | | | |
|---|---|---|---|---|
| 5,415,958 A * | 5/1995 | Takahashi et al. | ............ | 429/217 |
| 5,595,841 A * | 1/1997 | Suzuki | ............ | 429/217 |
| 5,707,759 A * | 1/1998 | Simon et al. | ............ | 429/217 |
| 5,846,674 A * | 12/1998 | Sakai et al. | ............ | 429/337 |
| 6,037,080 A * | 3/2000 | Kronfli et al. | ............ | 429/188 |
| 7,906,035 B2 * | 3/2011 | Tamori et al. | ............ | 252/62.2 |
| 2009/0053603 A1 | 2/2009 | Hoshiba et al. | ............ | 429/217 |
| 2009/0239147 A1 * | 9/2009 | Itou et al. | ............ | 429/217 |
| 2010/0173196 A1 * | 7/2010 | Itou et al. | ............ | 429/217 |

FOREIGN PATENT DOCUMENTS

| | | |
|---|---|---|
| CN | 101147284 A | 3/2008 |
| JP | 10 17714 | 1/1998 |
| JP | 11 7948 | 1/1999 |
| JP | 11 40162 | 2/1999 |
| JP | 11 288720 | 10/1999 |
| JP | 2001 210318 | 8/2001 |
| JP | 2002-25547 | 1/2002 |
| JP | 2003 223895 | 8/2003 |
| JP | 2003-317722 | 11/2003 |
| JP | 2004 172017 | 6/2004 |
| JP | 3601250 | 10/2004 |
| WO | WO 2006/101182 A1 * | 9/2006 |

* cited by examiner

*Primary Examiner* — Helene Klemanski
(74) *Attorney, Agent, or Firm* — Oblon, Spivak, McClelland, Maier & Neustadt, L.L.P.

(57) ABSTRACT

There is provided a binder composition for secondary battery electrode, containing
(A) a sulfonic acid group-containing polymer, and
(B) an organic solvent composed mainly of N-methylpyrrolidone,
wherein the proportion of the sulfonic acid group in the polymer (A) is 0.005 to 1.0 mmol/g.

5 Claims, No Drawings

BINDER COMPOSITION FOR SECONDARY BATTERY ELECTRODE, SLURRY FOR SECONDARY BATTERY ELECTRODE, AND SECONDARY BATTERY ELECTRODE

TECHNICAL FIELD

The present invention relates to a process for producing a compounded polymer composition suitably used as a binder composition for secondary battery electrode, a compounded polymer composition produced by the process, a paste for secondary battery electrode, and a secondary battery electrode.

BACKGROUND ART

In recent years, electronic appliances have become strikingly small and light. In connection therewith, the battery used therein as an electric source is strongly required to be small and light as well. Various secondary batteries have been developed so as to satisfy such a requirement; and nickel-hydrogen secondary battery and lithium ion secondary battery, for example, have been put to practical use.

As the process for producing an electrode which is a constituent member of the above secondary batteries, there is a process which comprises kneading an active material such as hydrogen absorbing alloy or graphite, carboxymethyl cellulose as a thickening agent, a styrene-butadiene copolymer latex as a binder and water as a dispersing medium to prepare a paste and coating the paste on the surface of a collector, followed by drying (for example, refer to Patent Documents 1 and 2).

In the above, the binder functions so as to increase the adhesivity between the electrode layer containing the active material and the collector. The styrene-butadiene copolymer latex, however, has not been fully satisfactory in the adhesivity with the collector. With a secondary battery using an electrode in which the adhesivity between electrode layer and collector is not sufficient, there is a problem that it is impossible to enhance the battery properties including charge-discharge cycle property.

As a prior art relevant to the problem, there is disclosed use, as a binder for lithium secondary battery, of a modified polymer obtained by introducing a functional group such as carboxyl group into a hydrogenated, diene polymer (for example, refer to Patent Document 3). Even with the binder disclosed in the Patent Document 3, however, the adhesivity between electrode layer and collector is not enhanced sufficiently. Further, in a secondary battery using an electrode of insufficient adhesivity, a reduction in capacity particularly in rapid discharge is striking.

Meanwhile, for alleviation of capacity reduction in rapid discharge (cycle property), there is disclosed an aqueous dispersion of a composite polymer obtained from a fluorine-containing polymer and an acrylic polymer containing a functional group such as carboxyl group (for example, refer to Patent Document 4). However, the electrode paste prepared using the aqueous dispersion of composite polymer, disclosed in the Patent Document 4, tends to generate a precipitate in some cases, when allowed to stand for a long period; and its stability of paste need be improved.

Patent Document 1: JP-A-1999-7948
Patent Document 2: JP-A-2001-210318
Patent Document 3: JP-A-1998-17714
Patent Document 4: JP No. 3601250

DISCLOSURE OF THE INVENTION

The present invention has been achieved in view of the problems in the related art. An object of the present invention is to provide a binder composition for secondary battery electrode, which can provide a secondary battery low in capacity reduction in rapid discharge and superior in cycle property, and is good in adhesivity with collector and superior in stability of slurry; a slurry for secondary battery electrode; and a secondary battery electrode which can provide a secondary battery low in capacity reduction in rapid discharge and superior in cycle property, and is good in adhesivity between electrode layer and collector.

As a result of extensive research by the inventors in order to accomplish the above object, the inventors have found that it is possible to accomplish the above object by using a polymer into which sulfonic acid group is introduced at a given proportion, and an organic solvent composed mainly of N-methylpyrrolidone.

That is, according to the present invention, the following binder composition for secondary battery electrode, a slurry for secondary battery electrode and a secondary battery electrode are provided.

[1] A binder composition for secondary battery electrode, containing (A) a sulfonic acid group-containing polymer, and (B) an organic solvent composed mainly of N-methylpyrrolidone, wherein the proportion of the sulfonic acid group in the polymer (A) is 0.005 to 1.0 mmol/g.

[2] A binder composition for secondary battery electrode according to [1], wherein the polymer (A) is (A1) a sulfonic acid group-containing, styrene/ethylene/butylene/styrene copolymer and/or (A2) a sulfonic acid group-containing acrylic copolymer.

[3] A binder composition for secondary battery electrode according to [2], wherein, when the polymer (A) is the sulfonic acid group-containing, styrene/ethylene/butylene/styrene copolymer (A1), the proportion of the structural unit derived from styrene, in the sulfonic acid group-containing, styrene/ethylene/butylene/styrene copolymer (A1) is 30% by mass or more.

[4] A binder composition for secondary battery electrode according to [2], wherein, when the polymer (A) is the sulfonic acid group-containing acrylic copolymer (A2), the sulfonic acid group-containing acrylic copolymer (A2) is a copolymer of monomer components comprising (meth)acrylic acid and/or a (meth)acrylic acid ester, and a compound containing, in the molecular structure, an unsaturated polymerizing group and a sulfonic acid group.

[5] A slurry for secondary battery electrode, containing a binder composition for secondary battery electrode according to any of [1] to [4], and an electrode active material.

[6] A slurry for secondary battery electrode according to [5], containing the binder for secondary battery electrode in an amount of 0.1 to 10 parts by mass (as solid) relative to 100 parts by mass of the electrode active material.

[7] A secondary battery electrode comprising a collector, and an electrode layer formed by coating a slurry for secondary battery electrode according to [5] or [6], on the surface of the collector, followed by drying the slurry.

The binder composition for secondary battery electrode, of the present invention can provide a secondary battery which is low in capacity reduction in rapid discharge and superior in cycle property, and is good in adhesivity with collector and superior in stability of slurry.

The slurry for secondary battery electrode, of the present invention can provide a secondary battery which is low in capacity reduction in rapid discharge and superior in cycle property, and is good in adhesivity with collector and superior in stability of slurry.

Also, the second battery electrode of the present invention can provide a secondary battery which is low in capacity reduction in rapid discharge and superior in cycle property, and is good in adhesivity between electrode layer and collector.

BEST MODE FOR CARRYING OUT THE INVENTION

The preferred embodiments for carrying out the present invention are described below. However, the present invention is not restricted to the following embodiments and it should be construed that there are also included, in the present invention, those embodiments in which appropriate changes, improvements, etc. have been made to the following embodiments based on the ordinary knowledge possessed by those skilled in the art, as long as there is no deviation from the gist of the present invention.

1. Binder Composition for Secondary Battery Electrode

An embodiment of the binder composition for secondary battery electrode of the present invention contains (A) a sulfonic acid group-containing polymer (hereinafter may be called "component (A)"), and (B) an organic solvent composed mainly of N-methylpyrrolidone (hereinafter may be called "component (B)"), wherein the proportion of the sulfonic acid group in the component (A) is 0.005 to 1.0 mmol/g. Detailed description thereof is made below.

(Component (A))

The component (A) contained in the binder composition for secondary battery electrode of the present embodiment is a sulfonic acid group-containing polymer. It is presumed that use of such a sulfonic acid group-containing polymer increases the adhesivity to various collectors such as aluminum, hardly gives rise to peeling, and enables production of a secondary battery superior in cycle property.

The proportion of the sulfonic acid group in the component (A) is 0.005 to 1.0 mmol/g, preferably 0.01 to 0.8 mmol/g, more preferably 0.02 to 0.6 mmol/g. When the proportion of the sulfonic acid group in the component (A) is below than 0.01 mmol/g, the adhesivity to collector is not increased sufficiently. Meanwhile, when the proportion of the sulfonic acid group in the component (A) exceeds 1.0 mmol/g, the stability of slurry tends to be low.

The weight average molecular weight (Mw) of the component (A) is preferably 30,000 to 200,000, more preferably 50,000 to 150,000, particularly preferably 70,000 to 130,000. When the Mw of the component (A) is below 30,000, the adhesivity to collector tends to be inferior. Meanwhile, when the Mw of the component (A) exceeds 200,000, the slurry for electrode obtained by using the binder composition has a high viscosity, which tends to make difficult the coating of the slurry. Incidentally, the "weight average molecular weight (Mw)" referred to in the present specification is a styrene-reduced molecular weight which is measured by gel permeation chromatography (GPC) using THF.

As to the component (A) contained in the binder composition for secondary battery electrode of the present embodiment, there is no particular restriction as long as it is a polymer containing a sulfonic acid group in a particular proportion. As specific examples of the component (A), there can be mentioned a sulfonic acid group-containing, styrene/ethylene/butylene/styrene polymer (a sulfonic acid group-containing SEBS) and a sulfonic acid group-containing acrylic copolymer (A2), an ethylene/propylene polymer, and a styrene/isoprene polymer. Of these, preferred are a sulfonic acid group-containing SEBS (A1), a sulfonic acid group-containing acrylic copolymer (A2) from a standpoint that the resulting binder composition for secondary battery electrode has higher adhesivity to collector.

(Sulfonic Acid Group-Containing SEBS (A1))

The proportion of the structural unit derived from styrene (the total bound styrene content) in the sulfonic acid group-containing SEBS (A1) is preferably 30% by mass or more, more preferably 40% by mass or more, particularly preferably 45% by mass or more. When the total bound styrene content is below 30% by mass, the adhesivity of the resulting binder composition for secondary battery electrode to collector tends to be slightly low. Incidentally, there is no particular restriction as to the upper limit of the total bound styrene content, but the content is preferably 80% by mass or less.

As specific examples of SEBS, there can be mentioned Dynaron (trade name, produced by JSR) series, RABALON (trade name, produced by Mitsubishi Chemical Corporation) series, Tuftec (trade name, produced by Asahi Chemical Industry Co., Ltd.) series, and TPE-SB (trade name, produced by Sumitomo Chemical Co., Ltd.) series.

The sulfonic acid group-containing SEBS (A1) can be produced by introducing sulfonic acid group into SEBS (sulfonating SEBS). Introduction of sulfonic acid group into SEBS can be conducted specifically by known methods described in Shin Jikken Koza (Vol. 14 III, p. 1773) compiled by The Chemical Society of Japan, JP-A-1990-227403, etc.

In the sulfonation, a sulfonating agent can be used. As the sulfonating agent, there can be preferably used a complex between sulfuric acid anhydride and electron-donating compound, a hydrogensulfite (e.g. Na salt, K salt or Li salt), sulfuric acid anhydride, chlorosulfonic acid, fuming sulfuric acid, etc. Incidentally, as the electron-donating compound used for preparation of the above-mentioned complex, there can be mentioned ethers such as N,N-dimethylformamide, dioxane, dibutyl ether, tetrahydrofuran, diethyl ether and the like; amines such as pyridine, piperazine, trimethylamine, triethylamine, tributylamine and the like; sulfides such as dimethyl sulfide, diethyl sulfide and the like; and nitrile compounds such as acetonitrile, ethyl nitrile, propyl nitrile and the like. Of these, preferred are N,N-dimethylformamide and dioxane.

In the sulfonation, it is also possible to use a solvent inert to the sulfonating agent such as sulfuric acid anhydride, sulfuric acid or the like. As the solvent inert to the sulfonating agent, there can be mentioned, for example, halogenated hydrocarbons such as chloroform, dichloroethane, tetrachloroethane, tetrachloroethylene, dichloromethane and the like; nitro compounds such as nitromethane, nitrobenzene and the like; liquid sulfur dioxide; aliphatic hydrocarbons such as propane, butane, pentane, hexane, cyclohexane and the like; ether type solvents such as dioxane, tetrahydrofuran and the like; and water. These solvents can be used by mixing two or more kinds appropriately.

The reaction temperature used in the sulfonation is ordinarily $-70$ to $200°$ C., preferably $-30$ to $50°$ C. When the temperature is below $-70°$ C., the sulfonation reaction is slow, which may not be economical. Meanwhile, when the temperature exceeds $200°$ C., a side reaction takes place and the product obtained may be black or insoluble.

(Sulfonic Acid Group-Containing Acrylic Copolymer (A2))

The sulfonic acid group-containing acrylic copolymer (A2) is a copolymer having at least a structural unit derived from (meth)acrylic acid and/or a (meth)acrylic acid ester. As the (meth)acrylic acid ester, there can be mentioned, for example, alkyl (meth)acrylates such as methyl (meth)acrylate, ethyl (meth)acrylate, propyl (meth)acrylate, isopropyl (meth)acrylate, butyl (meth)acrylate, isobutyl (meth)acrylate, tert-butyl (meth)acrylate, pentyl (meth)acrylate, amyl (meth)acrylate, isoamyl (meth)acrylate, hexyl (meth)acrylate, heptyl (meth)acrylate, octyl (meth)acrylate, isooctyl (meth)acrylate, 2-ethylhexyl (meth)acrylate, nonyl (meth)acrylate, decyl (meth)acrylate, isodecyl (meth)acrylate, undecyl (meth)acrylate, dodecyl (meth)acrylate, lauryl (meth)acrylate, stearyl (meth)acrylate, isostearyl (meth)acrylate and the like;

phenoxyalkyl (meth)acrylates such as phenoxyethyl (meth)acrylate, 2-hydroxy-3-phenoxypropyl (meth)acrylate and the like;

alkoxyalkyl (meth)acrylates such as methoxyethyl (meth)acrylate, ethoxyethyl (meth)acrylate, propoxyethyl (meth)acrylate, butoxyethyl (meth)acrylate, methoxybutyl (meth)acrylate and the like;

polyethylene glycol (meth)acrylates such as polyethylene glycol mono(meth)acrylate, ethoxydiethylene glycol (meth)acrylate, methoxypolyethylene glycol (meth)acrylate, phenoxypolyethylene glycol (meth)acrylate, nonylphenoxypolyethylene glycol (meth)acrylate and the like;

polypropylene glycol (meth)acrylates such as polypropylene glycol mono(meth)acrylate, methoxypolypropylene glycol (meth)acrylate, ethoxypolypropyelne glycol (meth)acrylate, nonylphenoxypolypropylene glycol (meth)acrylate and the like;

cycloalkyl (meth)acrylates such as cyclohexyl (meth)acrylate, 4-butylcyclohexyl (meth)acrylate, dicyclopentanyl (meth)acrylate, dicyclopentenyl (meth)acrylate, dicyclopentadienyl (meth)acrylate, bornyl (meth)acrylate, isobornyl (meth)acrylate, tricyclodecanyl (meth)acrylate and the like;

acrylamides such as (meth)acrylamide, α-chloroacrylamide, N,N'-methylene(meth)acrylamide, N,N'-ethylene (meth)acrylamide, N-hydroxymethyl(meth)acrylamide, N-2-hydroxyethyl(meth)acrylamide, N-2-hydroxypropyl(meth)acrylamide, N-3-hydroxypropyl(meth)acrylamide and the like;

unsaturated carboxylic acid nitriles such as (meth)acrylonitrile, α-chloroacrylonitrile, vinylidene cyanide and the like;

cyanoalkyl esters of unsaturated carboxylic acid, such as 2-cyanoethyl (meth)acrylate, 2-cyanopropyl (meth)acrylate, 3-cyanopropyl (meth)acrylate and the like;

benzyl (meth)acrylate; and tetrahydrofurfuryl (meth)acrylate.

The sulfonic acid group-containing acrylic copolymer (A2) can be produced, for example, by introducing sulfonic acid group into an acrylic copolymer (sulfonating an acrylic copolymer). Specifically, the sulfonic acid group-containing acrylic copolymer (A2) can be produced by the same method as used for the sulfonic acid group-containing SEBS (A1).

On the other hand, the sulfonic acid group-containing acrylic copolymer (A2) can be produced also by copolymerizing monomer components containing (meth)acrylic acid and/or a (meth)acrylic acid ester and a compound having, in the molecular structure, an unsaturated polymerizing group and a sulfonic acid group. Here, as the "compound having, in the molecular structure, an unsaturated polymerizing group and a sulfonic acid group", there can be mentioned vinylsulfonic acid, styrenesulfonic acid, sulfoethyl methacrylate, meta-allylsulfonic acid, 2-hydroxypropanesulfonic acid, metal salts thereof, etc. As specific preferred examples, there can be mentioned sodium styrenesulfonate (NaSS) and acrylamide-tert-butylsulfonic acid (ATBS).

Incidentally, the monomer components usable in production of the sulfonic acid group-containing acrylic copolymer (A2) can contain, besides (meth)acrylic acid, a (meth)acrylic acid ester and a compound having, in the molecular structure, an unsaturated polymerizing group and a sulfonic acid group, other monomer copolymerizable with the above monomers.

As other monomer, there can be mentioned, for example, styrene, α-methylstyrene and divinylbenzene.

(Component (B))

The component (B) contained in the binder composition for secondary battery electrode of the present embodiment is an organic solvent composed mainly of N-methylpyrrolidone (NMP). Here, "composed mainly of N-methylpyrrolidone (NMP)" means specifically that the organic solvent may contain other solvent as long as the physical and chemical properties of NMP are not impaired significantly. Therefore, the organic solvent may contain, for example, an organic solvent other than NMP in a very small amount. More specifically, "composed mainly of N-methylpyrrolidone (NMP)" means that the proportion of NMP contained in the component (B) is 95% by mass or more, preferably 97% by mass or more, more preferably 99% by mass or more, most preferably 100% by mass.

(Method for Preparation of Binder Composition for Secondary Battery Electrode)

The binder composition for secondary battery electrode of the present embodiment can be prepared by mixing the component (A) and the component (B) to dissolve the component (A) in the component (B). The mixing ratio of the two components can be determined appropriately depending upon the application of the secondary battery electrode produced. Therefore, there is no particular restriction as to the solid content of the binder composition for secondary battery electrode, of the present embodiment; however, the solid content is preferably 5 to 65% by mass, more preferably 10 to 60% by mass.

2. Slurry for Secondary Battery Electrode

Next, description is made on an embodiment of the slurry for secondary battery electrode of the present invention. The slurry for secondary battery electrode, of the present embodiment contains the above-mentioned binder composition for secondary battery electrode and an electrode active material. Incidentally, the slurry for secondary battery electrode, of the present embodiment can be prepared by mixing the binder composition for secondary battery electrode and the electrode active material together with various additives added as necessary.

The slurry for secondary battery electrode of the present embodiment contains the binder for secondary battery electrode in an amount of preferably 0.1 to 10 parts by mass in terms of solid content, more preferably 0.2 to 5 parts by mass, particularly preferably 0.3 to 4 parts by mass relative to 100 parts by mass of the electrode active material. When the amount of the binder for secondary battery electrode is below 0.1 part by mass, there is a tendency that no good adhesivity is obtained. Meanwhile, when the amount exceeds 10 parts by mass, a rise in overvoltage appears, which tends to affect the properties of the battery produced. Incidentally, in mixing the binder composition for secondary battery electrode and the electrode active material, there can be used various kneaders, a beads mill, a high-pressure homogenizer, etc.

As various additives as necessary added to the slurry for secondary battery electrode of the present embodiment, there can be used a viscosity-controlling polymer soluble in NMP, a conductive carbon such as graphite, a conductive material such as metal powder, etc. As the viscosity-controlling polymer soluble in NMP, there can be mentioned ethylene vinyl alcohol, polyvinyl alcohol, polyvinyl pyrrolidone, polyacrylamide, polymethyl methacrylate, polyvinylidene fluoride, etc.

As the electrode active material contained in the slurry for secondary battery electrode of the present embodiment, there can be preferably used a powder of hydrogen absorbing alloy, in the case of aqueous type battery such as nickel-hydrogen battery. Specifically explaining, there is preferably used a material obtained by using $MmNi_5$ as a base and substituting part of the Ni with an element such as Mn, Al, Co or the like. Incidentally, "Mm" indicates a Misch metal which is a mixture of rare earth elements. The electrode active material is preferably a powder having particle diameters of 3 to 400 μm, obtained by sifting through a 100-mesh sieve. In the case of non-aqueous type battery, there can be mentioned, for example, inorganic compounds such as $MnO_2$, $MoO_3$, $V_2O_5$, $V_6O_{13}$, $Fe_2O_3$, $Fe_3O_4$, $Li_{(1-x)}CoO_2$, $Li_{(1-x)}.NiO_2$, $Li_xCo_yS_{n_z}O_2$, $Li_{(1-x)}Co_{(1-y)}Ni_yO_2$, $TiS_2$, $TiS_3$, $MoS_3$, $FeS_2$, $CuF_2$, $NiF_2$ and the like; carbon materials such as carbon fluoride, graphite, vapor-phase-grown carbon fiber and/or ground material thereof, PAN-based carbon fiber and/or ground material thereof, pitch-based carbon fiber and/or ground material thereof, and the like; and conductive polymers such as polyacetylene, poly-p-phenylene and the like. Use of, in particular, lithium ion-containing composite oxide such as $Li_{(1-x)}CoO_2$, $Li_{(1-x)}.NiO_2$, $Li_xCo_ySn_zO_2$, $Li_{(1-x)}Co_{(1-y)}Ni_yO_2$ or the like is preferred because it enables assembling of both positive electrode and negative electrode in a discharge state.

As the active material for negative electrode, there can be mentioned, for example, carbon materials such as carbon fluoride, graphite, vapor-phase-grown carbon fiber and/or ground material thereof, PAN-based carbon fiber and/or ground material thereof, pitch-based carbon fiber and/or ground material thereof, and the like; conductive polymers such as polyacetylene, poly-p-phenylene and the like; and amorphous compounds composed of tin oxide or a compound of fluorine or the like. When using, in particular, a graphite material such as natural or synthetic graphite of high graphitization degree, graphitized meso phase carbon, or the like, a battery can be obtained which is good in charge-discharge cycle property and has a high capacity. When a carbonaceous material is used as the active material for negative electrode, the average particle diameter thereof is preferably 0.1 to 50 μm, more preferably 1 to 45 μm, particularly preferably 3 to 40 μm, in view of the reduction in current efficiency, the reduction in stability of slurry, the increase in resistance between particles in the electrode layer obtained, etc.

3. Secondary Battery Electrode

Next, description is made on an embodiment of the secondary battery electrode of the present invention. The secondary battery electrode of the present invention comprises a collector, and an electrode layer formed by coating the above-mentioned slurry for secondary battery electrode on the surface of the collector, followed by drying the slurry.

As the collector, there can be mentioned, in the case of aqueous type battery, a Ni mesh, a Ni-plated punching metal, an expanded metal, a wire net, a blowing metal, a sintered material of net-shaped metal fiber, etc. In the case of non-aqueous type battery, members such as aluminum foil, copper foil and the like can be mentioned as preferred examples. The above-mentioned slurry for secondary battery electrode is coated on at least one side of the collector in a given thickness, followed by heating and drying, to form an electrode layer, whereby a secondary battery electrode of the present embodiment can be obtained. In coating the slurry for secondary battery electrode on the surface of the collector, there can be employed a coating method using an appropriate coater head, such as reverse roll coating, comma bar coating, gravure coating, air-knife coating, or the like.

In heating and drying the slurry for secondary battery electrode, coated on the surface of the collector, there can be employed, for example, natural drying by standing, or drying using an air-blowing drier, a hot-air drier, an infrared heater, a far-infrared heater, or the like. The temperature of drying is ordinarily preferred to be 20 to 250° C., more preferred to be 130 to 170° C. The time of drying is preferably 1 to 120 minutes, more preferably 5 to 60 minutes.

The secondary battery electrode of the present embodiment can be preferably used as an electrode for any of aqueous type battery and non-aqueous type battery. It exhibits superior properties, for example, as a negative electrode of nickel-hydrogen battery which is an aqueous type battery, or as a negative electrode of alkali secondary battery or lithium ion battery both are non-aqueous type batteries.

In assembling a battery using the secondary battery electrode of the present embodiment, there is used, as a non-aqueous electrolytic solution, ordinarily an electrolytic solution wherein an electrolyte is dissolved in a non-aqueous solvent. As to the electrolyte, there is no particular restriction; however, in the case of alkali secondary battery, there can be mentioned $LiClO_4$, $LiBF_4$, $LiAsF_6$, $CF_3SO_3Li$, $LiPF_6$, LiI, $LiAlCl_4$, $NaClO_4$, $NaBF_4$, NaI, $(n-Bu)_4NClO_4$, $(n-Bu)_4NBF_4$, $KPF_6$, etc.

As the solvent used in the electrolytic solution, there can be used, for example, an ether, a ketone, a lactone, a nitrile, an amine, an amide, a sulfur compound, a chlorinated hydrocarbon, an ester, a carbonate, a nitro compound, a phosphoric acid ester compound, and a sulfolane compound. Of these, preferred are an ether, a ketone, a nitrile, a chlorinated hydrocarbon, a carbonate and a sulfolane compound. As specific examples, there can be mentioned tetrahydrofuran, 2-methyltetrahydrofuran, 1,4-dioxane, anisole, monoglyme, diglyme, triglyme, acetonitrile, propionitrile, 4-methyl-2-pentanone, butyronitrile, valeronitrile, benzonitrile, 1,2-dichloroethane, γ-butyrolactone, dimethoxyethane, methyl formate, propylene carbonate, ethylene carbonate, dimethylformamide, dimethyl sulfoxide, dimethylthioformamide, sulfolane, 3-methyl-sulfolane, trimethyl phosphate, triethyl phosphate, and mixed solvents thereof. As the electrolytic solution for aqueous type battery, an aqueous potassium hydroxide solution of 5 N or higher is used ordinarily.

As necessary, there are further used parts such as separator, terminal, insulating plate and the like, and a battery is constituted. As to the structure of the battery, there is no particular restriction, however, there can be exemplified a paper-shaped battery in which a positive electrode, a negative electrode and, as necessary, a separator are accommodated in a single layer or in a multi-layer, and a cylindrical battery in which a positive electrode, a negative electrode and, as necessary, a separator are wound in a roll shape. A secondary battery produced using the secondary battery electrode of the present embodiment can preferably be used in, for example, AV equipment, OA equipment and communication equipment.

EXAMPLES

The present invention is described below in detail by way of examples. Note that the present invention is not limited to the following examples. In the examples, "part(s)" means "part(s) by mass" and "%" means "% by mass" unless otherwise indicated. The methods used for measuring and evaluating various properties were as follows.

[Sulfonic Acid Group Content]

An obtained polymer solution was dried at 200° C. to obtain a dried polymer. The dried polymer was analyzed for sulfur and the sulfonic acid group content (mmol/g) in the polymer was calculated.

[Carboxylic Acid Group Content and Carboxylic Acid Anhydride Group Content]

5 g of an obtained polymer solution was placed in 100 ml of methanol to separate out a polymer. The separated polymer was vacuum-dried at 60° C. for 24 hours. 0.2 g of the dried polymer was weighed and dissolved in 100 ml of THF. The resulting solution was titrated with a 0.1 mmol/l aqueous KOH solution using phenolphthalein as an indicator. From the titration amount were calculated the carboxylic acid group content (mmol/g) or carboxylic acid anhydride group content (mmol/g) of the polymer.

[Peeling Strength]

A test specimen of 2 cm in width×10 cm in length was cut out from a battery electrode (positive electrode). The surface of the electrode layer side of the test specimen was attached to an aluminum plate using a double-coated tape. To the surface of the collector side of the test specimen was attached a tape of 18 mm in width [trade name "cellotape" (registered trademark), produced by Nichiban Co., Ltd.] (specified by JIS Z 1522). The tape was peeled in a 90° direction at a speed of 50 mm/min and the strength (g/cm) required was measured. The measurement was conducted 5 times and the average thereof was calculated and taken as peeling strength (g/cm). Incidentally, in the evaluation of the peeling strength obtained, it is interpreted that, with a larger peeling strength, the adhesivity between collector and electrode layer is higher and the peeling of electrode layer from collector is unlikely to occur.

[Cycle Property]

A double electrode-type coin cell produced was charged up to 4.2 V in a 25° C. atmosphere by a 0.2 C constant current method and then discharged down to 3.0 V. This charge-discharge cycle was repeated 50 cycles. The discharge capacity (mAh/g, discharge capacity per g of active material) of 50th cycle and the discharge capacity (mAh/g) of 1st cycle were measured, and Cycle property (%) was calculated from the following formula (1). In the evaluation of the cycle property obtained, it is interpreted that, with a higher cycle property, capacity reduction in rapid discharge is small and the cell produced is good in output property.

Cycle property(%)={(discharge capacity of 50th cycle)/(discharge capacity of 1st cycle)}×100 (1)

[Stability of Slurry]

A prepared slurry for positive electrode was allowed to stand at 25° C. for 3 days. Then, appearance of precipitate was observed visually. Evaluation was made based on the following standard.

○: There is no precipitate.
X: There is precipitate.

Example 1

In a separable flask were placed 1,150 parts of 1,2-dichloroethane, 90 parts of cyclohexane and 100 parts of a hydrogenated styrene-butadiene block copolymer ["Dynaron DR 8900" (trade name), produced by JSR, content of styrene-derived structural unit: 49%]. The mixture was stirred at 50° C. for 5 hours. Therein was placed 50 parts of acetic anhydride, after which 25 parts of sulfuric acid was dropwise added in 30 minutes. After the completion of the dropwise addition, the mixture was stirred at 50° C. for 2 hours. 5 parts of 2-propanol was placed to terminate a reaction. Then, 400 parts of a 10% aqueous sodium carbonate solution was added gradually to separate out a polymer. The separated polymer was washed with methanol and then with water until the pH of the washing became 8.0 or less. The polymer after washing was vacuum-dried at 50° C. for 1 day to obtain a dried polymer. In a separable flask were placed 100 parts of the dried polymer and 900 parts of NMP, followed by stirring at 50° C. for 2 hours to dissolve the dried polymer, whereby a polymer solution was obtained. Incidentally, the content of functional group (sulfonic acid group) of the polymer obtained was 0.3 mmol/g.

To 3 parts (in terms of solid) of the obtained polymer solution being stirred at 2,000 rpm using a corres-type disperser were gradually added 5 parts of acetylene black (produced by Denki Kagaku Kogyo kabushiki Kaisha) and 100 parts of lithium cobaltate (produced by Kishida kagaku). Then, stirring was conducted for 1 hour, under cooling. Thereafter, NMP was added for viscosity adjustment to about 10,000 mPa·s, to prepare a slurry for positive electrode. The slurry for positive electrode was uniformly coated on the surface of an aluminum foil using a doctor blade, so as to give a film thickness of 60 μm after drying. Drying was conducted at 120° C. for 2 hours, after which the dried material was roll-pressed so that the density of coating layer became 3.0 g/cm$^3$, to obtain an electrode (positive electrode) for evaluation. Incidentally, the stability of slurry for positive electrode was "○" and the peeling strength of the positive electrode was 50 g/cm.

In a two-electrode coin cell ["HS Flat Cell" (trade name), produced by Hosen Sha] was placed a punched lithium foil of 16.16 mm in diameter. Then, there was placed a separator ["Cell Guard #2400" (trade name), produced by Cell Guard] comprising a punched, polypropylene-made porous membrane of 18 mm in diameter, after which an electrolytic solution was poured with care being taken so as to prevent incoming of air. Then, a punched positive electrode of 15.95 mm in diameter was placed. An exterior body was fitted by tightening with a screw to produce a secondary battery. Incidentally, the electrolytic solution used was a solution obtained by dissolving LiPF$_6$ in a solvent of ethylene carbonate/ethyl methyl carbonate=1/1 in a concentration of 1 mol/liter. The cycle property of the secondary battery produced was 90%.

Example 2

A polymer solution was obtained in the same operation as in Example 1 except that there were used 100 parts of acetic anhydride, 50 parts of sulfuric acid and 800 parts of a 10% aqueous sodium carbonate solution. The content of functional group (sulfonic acid group) of the polymer obtained was 0.6 mmol/g. A slurry for positive electrode was prepared in the same operation as in Example 1 and an electrode (positive electrode) for evaluation was obtained. The evaluation result of the stability of slurry for positive electrode and the measurement result of the peeling strength of the positive electrode are shown in Table 1. Using the positive electrode obtained, a secondary battery was produced in the same operation as in Example 1. The measurement result of the cycle property of the secondary battery produced is shown in Table 1.

Example 3

In a separable flask were placed 200 parts of ion exchange water and 0.4 part of a reactive emulsifier ["ADEKA REASOAP SR 10" (trade name), produced by Asahi Denka Kogyo K.K.]. The flask inside was purged with nitrogen with stirring. Then, 0.4 part of potassium persulfate was added and the mixture was heated to 75° C. In another vessel were placed 50 pats of ion exchange water, 1 part of a reactive emulsifier ["ADEKA REASOAP SR 10" (trade name)], 20 parts of methyl methacrylate, 65 parts of n-butyl acrylate, 5 parts of diacetone acrylamide, 8 parts of acrylonitrile and 2 parts of SPINOMAR NaSS (produced by TOSOH CORPORATION). The mixture was emulsified with stirring to obtain an emulsion. The emulsion was dropwise added into the above-mentioned separable flask continuously in 3 hours. During the dropwise addition, nitrogen gas was introduced into the separable flask and the flask inside temperature was kept at 75° C. After the completion of the continuous dropwise addition, the mixture was heated to 80° C. and a reaction was conducted for 2 hours. Then, the mixture was cooled to 25° C. and its pH was adjusted to 7 using a 5% aqueous sodium hydroxide solution, to obtain an aqueous dispersion of a sulfonic group-containing polymer. In 100 g (in terms of solid) of the aqueous dispersion was placed 900 g of n-methylpyrrolidone, after which vacuum distillation was conducted at 80° C. to vaporize water, whereby a polymer solution was obtained. The content of functional group (sulfonic acid group) of the polymer obtained was 0.05 mmol/g. A slurry for positive electrode was prepared in the same operation as in Example 1 and an electrode (positive electrode) for evaluation was obtained. The evaluation result of the stability of slurry for positive electrode and the measurement result of the peeling strength of the positive electrode are shown in Table 1. Using the positive electrode obtained, a secondary battery was produced in the same operation as in Example 1. The measurement result of the cycle property of the secondary battery produced is shown in Table 1.

Example 4

A polymer solution was obtained in the same manner as in Example 1 except that the amount of methyl methacrylate was changed to 12 parts and the amount of SPINOMAR NaSS was changed to 10 parts. The content of functional group (sulfonic acid group) of the polymer obtained was 0.26 mmol/g. A slurry for positive electrode was prepared in the same operation as in Example 1 and an electrode (positive electrode) for evaluation was obtained. The evaluation result of the stability of slurry for positive electrode and the measurement result of the peeling strength of the positive electrode are shown in Table 1. Using the positive electrode obtained, a secondary battery was produced in the same operation as in Example 1. The measurement result of the cycle property of the secondary battery produced is shown in Table 1.

Example 5

A polymer solution was obtained in the same manner as in Example 1 except that the amount of methyl methacrylate was changed to 21.8 parts and the amount of SPINOMAR NaSS was changed to 0.2 parts. The content of functional group (sulfonic acid group) of the polymer obtained was 0.005 mmol/g. A slurry for positive electrode was prepared in the same operation as in Example 1 and an electrode (positive electrode) for evaluation was obtained. The evaluation result of the stability of slurry for positive electrode and the measurement result of the peeling strength of the positive electrode are shown in Table 1. Using the positive electrode obtained, a secondary battery was produced in the same operation as in Example 1. The measurement result of the cycle property of the secondary battery produced is shown in Table 1.

Example 6

A polymer solution was obtained in the same operation as in Example 1 except that there were used 180 parts of acetic anhydride, 90 parts of sulfuric acid and 1,450 parts of a 10% aqueous sodium carbonate solution. The content of functional group (sulfonic acid group) of the polymer obtained was 0.9 mmol/g. A slurry for positive electrode was prepared in the same operation as in Example 1 and an electrode (positive electrode) for evaluation was obtained. The evaluation result of the stability of slurry for positive electrode and the measurement result of the peeling strength of the positive electrode are shown in Table 1. Using the positive electrode obtained, a secondary battery was produced in the same operation as in Example 1. The measurement result of the cycle property of the secondary battery produced is shown in Table 1.

Comparative Example 1

A polymer solution was obtained in the same operation as in Example 1 except that there were used 230 parts of acetic anhydride, 115 parts of sulfuric acid and 1,840 parts of a 10% aqueous sodium carbonate solution. The content of functional group (sulfonic acid group) of the polymer obtained was 1.2 mmol/g. A slurry for positive electrode was prepared in the same operation as in Example 1 and an electrode (positive electrode) for evaluation was obtained. The evaluation result of the stability of slurry for positive electrode and the measurement result of the peeling strength of the positive electrode are shown in Table 1. Using the positive electrode obtained, a secondary battery was produced in the same operation as in Example 1. The measurement result of the cycle property of the secondary battery produced is shown in Table 1.

Comparative Example 2

In a separable flask were placed 900 parts of cyclohexane and 900 parts of N-methylpyrrolidone. The mixture was stirred to obtain a uniform solution. Then, 100 parts of a hydrogenated, styrene-butadiene block copolymer ["Dynaron DR 8900" (trade name)] was placed. The mixture was stirred at 65° C. for 10 hours to dissolve the hydrogenated, styrene-butadiene block copolymer. Then, vacuum distillation was conducted at 70° C. using an evaporator until a slid content of 10% was reached, whereby cyclohexane was evaporated and a polymer solution was obtained. A slurry for positive electrode was prepared in the same operation as in Example 1 and an electrode (positive electrode) for evaluation was obtained. The evaluation result of the stability of slurry for positive electrode and the measurement result of the peeling strength of the positive electrode are shown in Table 1. Using the positive electrode obtained, a secondary battery was produced in the same operation as in Example 1. The measurement result of the cycle property of the secondary battery produced is shown in Table 1.

Comparative Example 3

100 parts of a hydrogenated, styrene-butadiene block copolymer ["Dynaron DR 8900" (trade name)] was placed in a laboratory plastomill set at 190° C. and melted. Thereto were added 2.5 parts of maleic anhydride and 0.15 part of 2,5-dimethyl-2,5-bis(tert-butylperoxy)hexane ["Perhexa 25B" (trade name), produced by Nippon Oils and Fats Co., Ltd.]. They were mixed at 80 rpm for about 6 minutes for addition of maleic anhydride. To 100 parts of the acid anhydride-modified polymer obtained was added 900 parts of NMP. The mixture was stirred at 80° C. for 5 hours to obtain a polymer solution. The content of the functional group (carboxylic acid group) of the polymer obtained was 0.3 mmol/g. A slurry for positive electrode was prepared in the same operation as in Example 1 and an electrode (positive electrode) for evaluation was obtained. The evaluation result of the stability of slurry for positive electrode and the measurement result of the peeling strength of the positive electrode are shown in Table 1. Using the positive electrode obtained, a secondary battery was produced in the same operation as in Example 1. The measurement result of the cycle property of the secondary battery produced is shown in Table 1.

Comparative Example 4

In a separable flask were placed 200 parts of ion exchange water and 0.4 part of a reactive emulsifier ["ADEKA REASOAP SR 10" (trade name)]. The flask inside was purged with nitrogen with stirring. Then, 0.4 part of potassium persulfate was added and the mixture was heated to 75° C. In another vessel were placed 50 parts of ion exchange water, 1 part of a reactive emulsifier ["ADEKA REASOAP SR 10" (trade name)], 18 parts of methyl methacrylate, 65 parts of n-butyl acrylate, 5 parts of diacetone acrylamide, 8 parts of acrylonitrile and 4 parts of acrylic acid. The mixture was emulsified with stirring to obtain an emulsion. The obtained emulsion was dropwise added into the above-mentioned separable flask continuously in 3 hours. During the dropwise addition, nitrogen gas was introduced into the separable flask and the flask inside temperature was kept at 75° C. After the completion of the continuous dropwise addition, the mixture was heated to 80° C. and a reaction was conducted for 2 hours. Then, the mixture was cooled to 25° C. and its pH was adjusted to 7 using a 5% aqueous sodium hydroxide solution, to obtain an aqueous dispersion of a sulfonic group-containing polymer. In 100 g (in terms of solid) of the aqueous dispersion was placed 900 g of n-methylpyrrolidone, after which vacuum distillation was conducted at 80° C. to vaporize water, whereby a polymer solution was obtained. The measurement of carboxylic acid group was conducted using the aqueous dispersion before the neutralization with the aqueous sodium hydroxide solution. The content of functional group (carboxylic acid group) of the polymer obtained was 0.55 mmol/g. A slurry for positive electrode was prepared in the same operation as in Example 1 and an electrode (positive electrode) for evaluation was obtained. The evaluation result of the stability of slurry for positive electrode and the measurement result of the peeling strength of the positive electrode are shown in Table 1. Using the positive electrode obtained, a secondary battery was produced in the same operation as in Example 1. The measurement result of the cycle property of the secondary battery produced is shown in Table 1.

TABLE 1

| | Functional Group | Functional group content (mmol/g) | Stability of slurry | Peeling strength (g/cm) | Cycle property (%) |
|---|---|---|---|---|---|
| Exam. 1 | Sulfonic acid group | 0.3 | ○ | 50 | 90 |
| Exam. 2 | Sulfonic acid group | 0.6 | ○ | 55 | 95 |
| Exam. 3 | Sulfonic acid group | 0.05 | ○ | 45 | 90 |
| Exam. 4 | Sulfonic acid group | 0.26 | ○ | 50 | 90 |
| Exam. 5 | Sulfonic acid group | 0.005 | ○ | 40 | 90 |
| Exam. 6 | Sulfonic acid group | 0.9 | ○ | 40 | 90 |
| Comp. Exam. 1 | Sulfonic acid group | 1.2 | X | 30 | 60 |
| Comp. Exam. 2 | None | 0 | X | 30 | 65 |
| Comp Exam. 3 | Carboxylic anhydride group | 0.3 | X | 25 | 50 |
| Comp. Exam. 4 | Carboxylic acid group | 0.55 | X | 25 | 50 |

It is clear from Table 1 that, when there are used the binder compositions for secondary battery electrode and slurries for secondary battery electrode, of Examples 1 to 6, as compared with when there are used the binder compositions for secondary battery electrode and slurries for secondary battery electrode, of Comparative Examples 1 to 4, the Stability of slurry is superior and an electrode superior in adhesivity between collector and electrode layer can be produced.

Furthermore, it is further clear that, when there are used the secondary battery electrodes of Examples 1 to 6, as compared with when there are used the secondary battery electrodes of Comparative Examples 1 to 4, a secondary battery superior in cycle property can be provided.

INDUSTRIAL APPLICABILITY

By using the binder composition for secondary battery electrode of the present invention, it is possible to provide a secondary battery which is low in capacity reduction in rapid discharge, is superior in cycle property, and can be preferably used in AV equipment, OA equipment, communication equipment, etc.

The invention claimed is:

1. A binder composition for a secondary battery electrode, comprising:
(A) a sulfonic acid group-containing polymer, and
(B) an organic solvent comprising N-methylpyrrolidone, wherein
the proportion of the sulfonic acid group in the polymer (A) is 0.005 to 1.0 mmol/g;
the polymer (A) comprises (A1) a sulfonic acid group-containing styrene/ethylene/butylene/styrene copolymer, and optionally comprises (A2) a sulfonic acid group-containing acrylic copolymer; and
the proportion of the structural unit derived from styrene, in the sulfonic acid group-containing styrene/ethylene/butylene/styrene copolymer (A1), is 30% by mass or more.

2. The binder composition for a secondary battery electrode according to claim 1, wherein the polymer (A) comprises the sulfonic acid group-containing acrylic copolymer (A2), and the sulfonic acid group-containing acrylic copolymer (A2) is a copolymer of monomer components comprising:
(meth)acrylic acid and/or a (meth)acrylic acid ester, and
a compound containing, in the molecular structure, an unsaturated polymerizing group and a sulfonic acid group.

3. A slurry for a secondary battery electrode, containing
a binder composition for a secondary battery electrode according to claim 1, and
an electrode active material.

4. The slurry for a secondary battery electrode according to claim 3, containing the binder for a secondary battery electrode in an amount of 0.1 to 10 parts by mass (as solid) relative to 100 parts by mass of the electrode active material.

5. A secondary battery electrode comprising
a collector, and
an electrode layer formed by coating a slurry for a secondary battery electrode according to claim 3, on the surface of the collector, followed by drying the slurry.

* * * * *